United States Patent Office 3,478,189
Patented Nov. 11, 1969

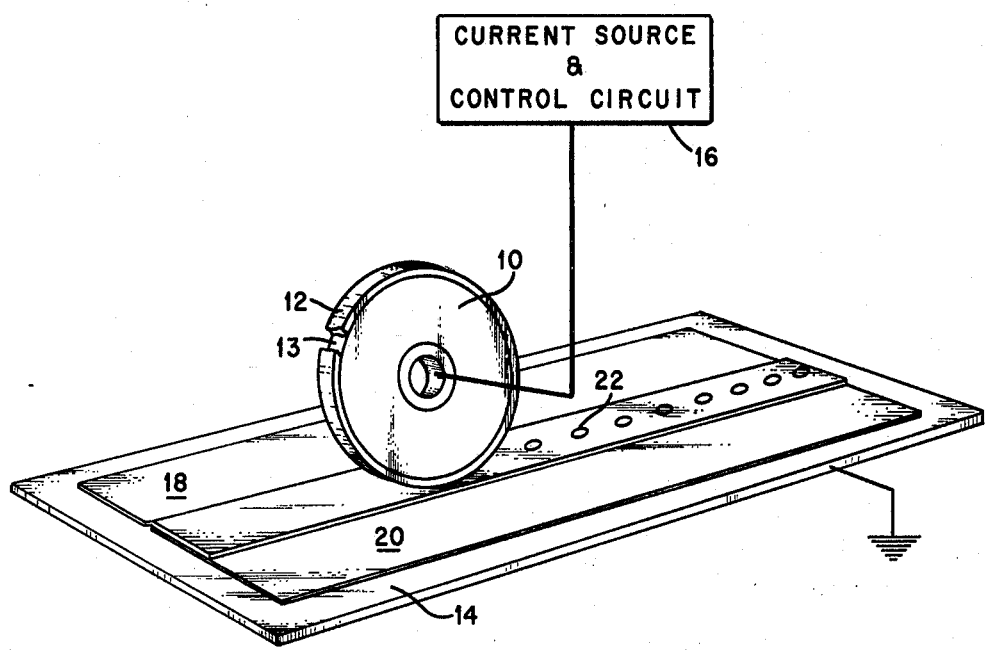

3,478,189
WHEEL-TYPE ELECTRODE FOR WELDING BERYLLIUM METAL
Chester L. Estes, Oak Ridge, Tenn., assignor to the United States of America as represented by the United States Atomic Energy Commission
Filed Oct. 19, 1967, Ser. No. 677,009
Int. Cl. B23k 11/06, 9/24
U.S. Cl. 219—81                        3 Claims

ABSTRACT OF THE DISCLOSURE

In the art of resistance spot welding, a wheel-type electrode for welding beryllium metal is provided with a coating of beryllium-containing metal on the working face thereof to enhance the welding characteristics of the wheel and improve the properties of the weld. Electrode "sticking" and deposition of electrode material in the weldment are virtually eliminated by employing this coated electrode.

---

The present invention relates generally to a wheel-type electrode for effecting resistance spot welding of metal, and more particularly to such a wheel-type electrode for welding beryllium wherein the welding face on the wheel is provided with a thin coating of beryllium and/or beryllium-containing metal for facilitating the welding operation. This invention was made in the course of, or under, a contract with the U.S. Atomic Energy Commission.

Beryllium metal has for some time enjoyed considerable usage as a structural material because of its nuclear properties, light weight, and high strength at elevated temperatures. However, some problems have been encountered in the fabrication of various beryllium structures due to difficulties in joining beryllium to beryllium. For example, the joining of thin beryllium sheet stock or foil down to a thickness of about 2 mils has been previously accomplished by employing resistance spot welding procedures. The phrase "resistance spot welding" relates to a process by which a weldment is provided by heat due to the resistance to the flow of electrical current through the faying surfaces of the metal being joined while these surfaces are disposed between and subjected to a pressure loading by non-consumable electrodes. The use of a wheel-shaped electrode as one of the two electrodes has proven to be a highly satisfactory mechanism for facilitating certain spot welding operations in that the wheel-configured electrode can be rolled in a relatively rapid manner along at least one of the beryllium workpieces being joined while an electric current is intermittently passed through the faying surfaces of these workpieces to effect the formation of longitudinally spaced apart spot welds for joining together the pieces of beryllium metal. The problems attendant with using the wheel-like electrode include the selection of materials forming the electrode since the spot weld occurs at the location of highest resistance in and between the electrodes. This phenomenon necessarily requires that the electrodes be formed of materials exhibiting greater conductivity than that of the metal being spot welded.

A wheel-type electrode found to be useable for spot welding beryllium consists of a copper-chromium alloy with an electrical conductivity of about 80% of the International Annealed Copper Standard (IACS) and a hardness of about 70 to 80 on the Rockwell B hardness scale. Beryllium metal has an electrical conductivity of about 40% IACS and is of a greater hardness than the copper-chromium wheel. However, the use of this wheel has been found to be somewhat objectionable for spot welding beryllium metal in that the electrode frequently sticks to the beryllium metal and, in some instances, tears holes in the metal being joined. Further, since the copper-chromium wheel is softer than beryllium, the metals are attracted towards one another, which causes portions of the peripheral or welding face of the wheel to pick up and become spotted with beryllium metal. Thus, with some parts of the wheel face coated with beryllium while other parts of the face are free of beryllium, the welds become uneven and somewhat undesirable. This condition was previously corrected by stopping the welding operation after approximately one revolution of the wheel and removing the beryllium collected on the wheel face. Also, copper from the wheel is sometimes infused into the weldment during the welding operation and, while this condition may be acceptable under some circumstances, it may also be objectionable in other circumstances because of the undesirable presence of the copper in the welded structure from a nuclear property standpoint.

It is the aim of the present invention to obviate or minimize the above and other shortcomings found in resistance spot welding of beryllium metal by providing a novel wheel-type electrode construction. In accordance with the present invention the entire welding face of the wheel-type electrode is provided with a thin, uninterrupted and relatively uniform coating of beryllium and/or beryllium-containing metal which is utilized as a contacting surface with the beryllium pieces being joined. By employing this beryllium coating on the electrode face, it was discovered that the spot welds exhibited substantial improvements in appearance and physical properties. The over-all welding operation was greatly improved since the problem of electrode sticking was eliminated and since the welding operation was maintainable over significantly greater lengths of metal without interruption due to the uneven welding conditions previously encountered. Also, this electrode coating prevented the deposition of any foreign or undesirable material in the weldment, e.g., the deposition of copper as noted above.

An object of the present invention is to provide a new and improved mechanism for effecting the resistance spot welding of beryllium metal.

Another object of the present invention is to provide a wheel-type electrode with a coating of beryllium metal and/or a beryllium-containing metal on the peripheral face thereof for effecting and facilitating the resistance spot welding of beryllium metal.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawing, the figure is a somewhat schematic showing of a wheel-type electrode provided with a coating of beryllium and/or beryllium-containing metal on the working surface thereof and the working relationship of this wheel surface to underlying beryllium workpieces. The thickness of this coating on the wheel is substantially exaggerated and partially broken away for purposes of illustration.

As briefly mentioned above, the present invention contemplates an improvement in the welding of beryllium metal by resistance spot welding. This improvement is accomplished by providing a conventional wheel-type electrode with a coating of beryllium and/or beryllium-containing alloy on the welding face thereof, i.e., the outermost or beryllium workpiece contacting face. As previously pointed out, the pickup of beryllium metal onto the wheel welding surface at the points where the welding current is passed through the wheel face for effecting the spot weld was considered highly objectionable because of the resulting uneven welds and the erratic welding operation. Consequently, the standard procedure heretofore practiced when the wheel face became sporadically coated with beryllium was to interrupt the welding operation and remove the beryllium spots on the wheel before resuming the welding operation. In accordance with the present invention it was discovered that unobvious improvements in the weldments and the welding operation could be realized by providing the wheel face with a thin and continuous or uninterrupted coating of beryllium. These results were unexpected since it was previously believed that the existence of a material exhibiting the same or essentially the same electrical resistance at a location between the electrode and the workpieces would inhibit the formation of acceptable spot welds. However, in spite of this premise, the coating on the electrode was found not to adversely affect the welding operation or the weldments in the manner normally expected. Apparently the reason for the unexpected success of the electrode coating of the present invention is that the coating is very thin, e.g., in the order of about 1–3 mils, so that the over-all eletcrical resistance imposed by this coating is sufficiently small as compared to that of the workpieces so as not to interfere with resistance spot welding of the latter. Perhaps another reason for the coating's not detracting from the electrical flow needed for the spot welding of the workpieces is that the coating (at least the portion of the coating nearest the electrode surface) is believed to be composed of a beryllium-copper alloy which would provide an electrical conductivity in an IACS range between that of the electrode and that of the beryllium workpieces.

As schematically shown in the drawing, the conventional wheel-type electrode 10 is provided with a continuous coating or layer 12 of beryllium and/or a beryllium-copper alloy about the entire peripheral face 13 thereof. This coating 12 is preferably of about 1–3 mils in thickness and may be provided on the electrode 10 by rolling the electrode 10 over a beryllium metal surface while conducting a current through the electrodes 10 and 14 in the manner normally employed during the spot welding operation. With a 3-inch diameter electrode 10 and the current intermittently applied from a conventional spot welding current source and control circuit such as generally shown at 16, a coating 12 of the desired thickness may be obtained after a rolling distance of approximately ten feet. Or, if desired, the coating 12 may be applied to the electrode face 13 in the same manner as just described except for passing a continuously applied current through the electrodes. The employment of the latter technique provides a continuous coating on the electrode face after rolling the wheel-type electrode for a distance of about six feet.

The coating 12 is beryllium colored and, as previously mentioned, is believed to be composed of a beryllium-copper alloy nearest the wheel electrode face 13 with the percentage of beryllium in the coating increasing in a gradient manner as the coating thickness increases to where the coating may consist virtually of or even entirely of beryllium near the exposed or outermost surface thereof.

The mechanism by which the coating adheres to the electrode face 13 is not entirely clear, but it is believed that with the above-noted alloying effect a tenacious metallurgical bond is established between the coating 12 and the copper-chromium electrode 10.

In a typical spot welding operation, the beryllium sheets to be joined together as shown at 18 and 20 are placed with the faying surfaces in an overlapping relatoinship on a conducting surface which serves as the other electrode 14. The wheel-type electrode 10 is then rolled along the imbrication of the beryllium pieces 18 and 20 under the influence of a pressure loading from a suitable source (not shown) to effect the establishment of weldments or spot welds 22 at predetermined and longitudinally spaced apart locations by conveying a current from the current source and control circuit 16 through the electrodes to cause localized heating of the beryllium metal which in turn effects the weld. In the welding of beryllium metal of about 2.5 to 3.5 mils thickness, a 3-inch diameter wheel-type electrode with a rolling speed of about 9–21 inches per minute under the influence of a 60-cycle current source was used to provide 19–21 spot welds per inch with an average spot diameter of about 20 mils. The wheel-type electrode was subejcted to about at 21-pound pressure loading and a current of about 4 kiloamperes for effecting these spot welds.

After using the coated wheel-type electrode of the present invention for welding over a considerable length of beryllium metal there may be a roughening of the exposed coating surface due to the picking up of additional beryllium metal. This surface may be easily dressed for reuse by employing a suitable grinding mechanism thereagainst to smooth the coated surface. Further, the dressing of the coating on the wheel-type electrode sometimes becomes necessary for assuring that the coating remains sufficiently thin so as not to interfere with the current flow through the electrodes.

It will be seen that the present invention affords a substantial improvement over the spot welding mechanisms and techniques previously employed in that the weldments exhibit substantially more uniformity in appearance and improvements in physical properties. Further, the copper-chromium welding wheel without a coating on the welding surface thereof is good for only about 6 or 7 inches of spot welding before the surface becomes excessively rough so as to be undesirable, while, on the other hand, the same copper-chromium wheel coated with berylllium in accordance with the present invention has been used for distances of over 7000 inches without any deleterious effects.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What is claimed is:

1. In the art of joining metal by resistance spot welding, an improved wheel-type electrode for effecting the resistance spot welding of beryllium metal, comprising a rotatable body formed of a material exhibiting greater electrical conductivity than that of beryllium and having a peripherally disposed surface of revolution, and a layer of metal secured to said surface and sufficiently covering said surface so as to be essentially continuously disposed over the entire surface of revolution, said layer consisting essentially of beryllium and said material at the interface between the layer and said body with the quantity of beryllium increasing in a gradient manner towards the outermost surface of the layer where the latter consists essentially entirely of beryllium.

2. The improved wheel-type electrode claimed in claim 1, wherein said layer is of a thickness in the range of about 1 to 3 mils.

3. The improved wheel-type electrode claimed in claim 1, wherein said material consists essentially of a copper-chromium alloy.

References Cited

UNITED STATES PATENTS

| 2,025,662 | 12/1935 | Hensel et al. | 219—119 |
| 3,184,835 | 5/1965 | Coxe et al. | 219—119 |

JOSEPH V. TRUHE, Primary Examiner

L. A. ROUSE, Assistant Examiner

U.S. Cl. X.R.

219—84, 119